(No Model.)
C. A. METTE & E. S. RAYBURN.
BICYCLE DRIVING GEAR.
No. 578,701.　　　　　　　　　Patented Mar. 9, 1897.
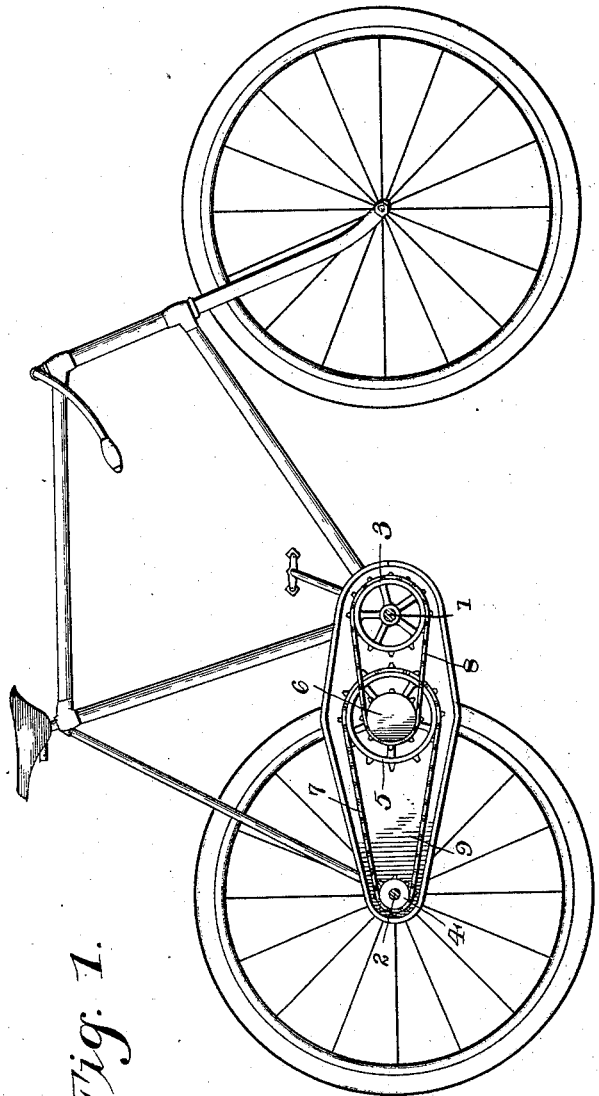
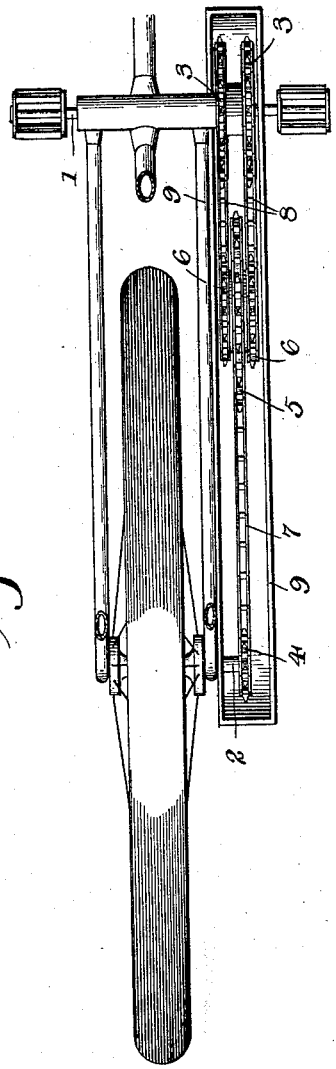
Witnesses
Chas. A. Ford.
R. M. Smith.
By their Attorneys.
Inventors
Charles A. Mette,
Eddy S. Rayburn,
C. A. Snow & Co.
THE NORRIS PETERS CO., PHOTO-LITHO., WASHINGTON, D. C.

UNITED STATES PATENT OFFICE.

CHARLES ANTHONY METTE AND EDDY SHERMAN RAYBURN, OF SAN JOSÉ, CALIFORNIA.

BICYCLE DRIVING-GEAR.

SPECIFICATION forming part of Letters Patent No. 578,701, dated March 9, 1897.

Application filed June 17, 1895. Serial No. 553,134. (No model.)

*To all whom it may concern:*

Be it known that we, CHARLES ANTHONY METTE and EDDY SHERMAN RAYBURN, citizens of the United States, residing at San José, in the county of Santa Clara and State of California, have invented a new and useful Bicycle Driving-Gear, of which the following is a specification.

This invention relates to an improvement in driving-gear for bicycles, being designed especially for use in connection with that class of machines known as "safeties," in which small wheels are employed and it becomes necessary to interpose suitable gearing between the crank-axle and the drive-wheel axle for the purpose of speeding up or driving the propelling-wheel at a higher speed than the crank-shaft.

The object of the present invention is to connect the crank-axle and the driving-wheel shaft by means of a train of gearing, by means of which any desired speed may be attained and wherein means is employed for automatically taking up the slack in the sprocket-chains interposed between and running around the several wheels.

Other objects and advantages of the invention will appear in the course of the subjoined description.

The invention consists in certain novel features and details of construction and arrangement of parts, as hereinafter fully described, illustrated in the drawings, and finally embodied in the claims.

In the accompanying drawings, Figure 1 is a side elevation of a bicycle provided with driving mechanism constructed in accordance with this invention. Fig. 2 is an enlarged plan view showing the form and arrangement of the sprocket-wheels and connecting-chains.

Similar numerals of reference designate corresponding parts in both figures of the drawings.

Referring to the accompanying drawings, wherein is represented a bicycle of the ordinary safety pattern, 1 designates the crank-axle or pedal-shaft, and 2 the axle of the rear driving-wheel. For the purposes of carrying out the present invention the crank-axle or pedal-shaft 1 is provided at one side with a pair of sprocket-wheels 3, which are duplicates of each other, and, if preferred, may be formed integrally with a common hub or both keyed or fixed upon said crank-axle, so as to revolve in unison.

4 designates a small sprocket-wheel which is adapted to revolve with the driving-wheel by being rigidly mounted upon the hub thereof or by being keyed to the shaft of said driving-wheel in case the latter revolves and has a fixed relation with the driving-wheel.

Interposed between the duplicate sprocket-wheels 3 on the crank-axle and the small sprocket-wheel 4 on the driving-wheel is an intermediate sprocket-wheel 5, which is illustrated as being of greater diameter than the other sprocket-wheels 3 and 4. Formed integrally with or secured to said intermediate sprocket-wheel are two smaller sprocket-wheels 6, arranged one upon each side of the intermediate sprocket and concentric therewith.

The wheels 5 and 6 together form what may be called a "triplex sprocket-wheel," and this may be arranged in very close proximity to the duplicate sprockets 3 by spacing the latter a sufficient distance apart to enable the teeth of the large intermediate sprocket 5 to revolve between them.

7 represents an endless sprocket-chain which extends around the large intermediate sprocket 5 and the small sprocket 4 on the drive-wheel, and 8 indicates a pair of endless chains which extend around the duplicate sprockets 3 and the small intermediate sprockets 6, as shown.

It will be seen that by reason of the intermediate small sprockets 6 being of less diameter than the duplicate sprockets 3 on the crank-axle the intermediate triplex sprocket will be driven at greater speed than the crank-axle. It will also be seen that by reason of the small sprocket 4 on the drive-wheel being of less diameter than the large intermediate sprocket 5 said small sprocket will be rotated at higher speed than the intermediate sprocket. In this manner the driving-wheel is driven at a higher rate of speed than the crank-axle, and it will be apparent that by varying the relative sizes of the several sprocket-wheels described the speed at which the driving-wheel is revolved may be regulated as desired.

9 designates a pair of plates, of any light strong material, arranged upon each side of the driving-gear above described and supported at opposite ends upon the crank-axle and driving-wheel axle, or in any convenient or preferred manner, according to the make of the machine to which the driving mechanism is applied. These plates are shown in dotted lines in Fig. 1 as being kite-shaped or of increased vertical width intermediate their ends. The object of increasing the depth of these plates, which constitute the casing for inclosing the gears, in the manner shown, is to provide for the vertical movement or play of the intermediate triplex sprocket-wheel, which is not mounted upon a shaft, but allowed to rest loosely between the casing-plates 9 and to obtain its support solely from the sprocket-chains 7 and 8, which pass around the same and extend in opposite directions therefrom. The opposite side faces of this triplex sprocket-wheel are purposely left plain and smooth, so as to enable them to bear with very slight pressure against the inner adjacent faces of the casing-plates, for keeping said sprocket in proper alinement with the other sprocket-wheels. The casing for inclosing the sprocket wheels and chains described is completed in any desired manner so as to entirely cover and incase the driving mechanism, and a portion of said casing may also be made removable for attaining access to such mechanism when necessary.

By means of the construction above described it will be seen that the driving-wheel of the machine may be driven at any relative speed as compared with the crank-axle. It will also be seen that by reason of the particular manner in which the triplex gear is suspended upon the chains which pass around the duplicate gears on the crank-axle and the small sprocket on the driving-wheel axle all slack in said chains is automatically taken up.

Changes in the form, proportion, and minor details of construction may be resorted to without departing from the spirit or sacrificing any of the advantages of this invention.

Having thus described the invention, what is claimed as new, and desired to be secured by Letters Patent, is—

1. In a bicycle driving mechanism, the combination with the driving-wheel and the crank-axle, of duplicate sprocket-wheels fast on one of said parts and both located upon the same side of the machine, a sprocket-wheel fast on the other part, and a journalless triplex sprocket-wheel interposed between the single and duplicate sprocket-wheels and operatively connected therewith by drive-chains, whereby the intermediate triplex sprocket automatically takes up slack in the drive-chains, substantially as described.

2. In a bicycle driving mechanism, the combination with the crank-axle, of duplicate sprocket-wheels fixedly mounted thereon, at or near one end and both upon the same side of the machine, a sprocket-wheel carried by the driving-wheel of the machine, and a journalless triplex sprocket-wheel interposed between said duplicate sprockets and the sprocket on the driving-wheel, said triplex sprocket being suspended upon and by means of sprocket-chains extending in opposite directions therefrom to and around the duplicate and drive-wheel sprockets, whereby said intermediate sprocket is adapted to automatically take up slack in the sprocket-chains, substantially as specified.

3. In a bicycle driving mechanism, the combination with the crank-axle, of duplicate sprocket-wheels fixed thereto at or near one end and both upon the same side of the machine, a sprocket-wheel having a rigid connection with the driving-wheel, an inclosing case comprising an oppositely-disposed pair of plates arranged upon each side of said sprocket-wheels and supported in the manner described, and a journalless triplex sprocket-wheel arranged intermediate of the crank-axle and drive-wheel axle and suspended only upon the drive-chains passing around the same and extending in opposite directions to said duplicate sprockets and drive-wheel sprocket, said intermediate sprocket being arranged within and adapted to move vertically between and be guided by the side plates of the inclosing case, whereby the proper alinement of said intermediate gear is preserved and slack in the drive-chains automatically taken up, substantially as set forth.

4. In a bicycle, the combination of the front and rear sprockets, with a set of intermediate sprockets between the front and rear sprockets connected thereto by chains and suspended by the chains, substantially as described.

In testimony that we claim the foregoing as our own we have hereto affixed our signatures in the presence of two witnesses.

CHARLES ANTHONY METTE.
EDDY SHERMAN RAYBURN.

Witnesses:
  M. H. METTE,
  E. R. BAILEY.